(No Model.)

D. F. BLIGHTON.
TRACK BOLT LOCK.

No. 289,379. Patented Dec. 4, 1883.

Witnesses.
J. M. Caldwell
J. Sangster

Inventor.
D. Franklin Blighton
By James Sangster
Atty.

United States Patent Office.

D. FRANKLIN BLIGHTON, OF BUFFALO, NEW YORK.

TRACK-BOLT LOCK.

SPECIFICATION forming part of Letters Patent No. 289,379, dated December 4, 1883.

Application filed May 19, 1883. (No model.)

*To all whom it may concern:*

Be it known that I, D. FRANKLIN BLIGHTON, a citizen of the United States, residing in Buffalo, in the county of Erie and State of New York, have invented certain new and useful Improvements in Track-Bolt Locks, of which the following is a specification.

My invention relates to a certain means for locking a track-bolt, and will be fully and clearly hereinafter shown and described by reference to the accompanying drawings, in which—

Figure 1:
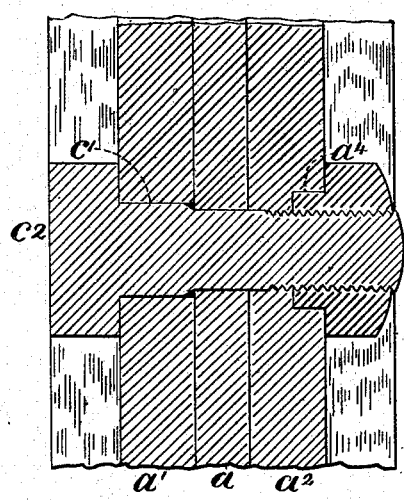
Figure 2:
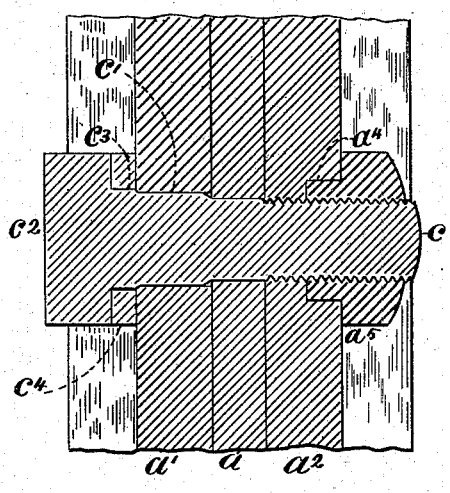
Figure 3:
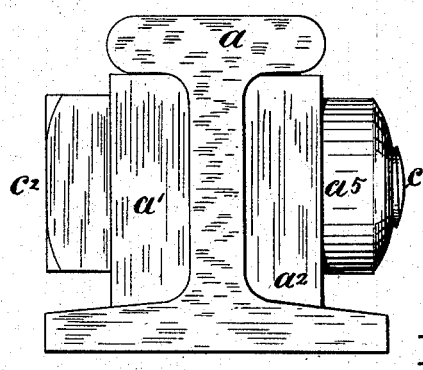
Figure 4:
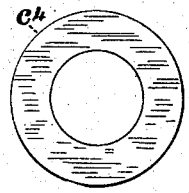
Figure 5:
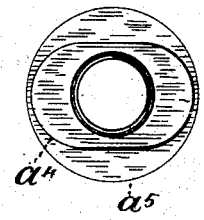
Figure 6:
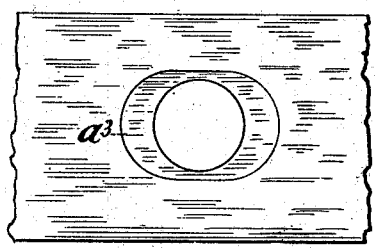

Figure 1 is a horizontal section through the device and a portion of the rail and fish-plates. Fig. 2 is also a horizontal section through the device and through a portion of the rail and fish-plates, showing a modified form of the device adapting the bolt to be used a second time. Fig. 3 is an end view showing the device together. Fig. 4 is a face view of the washer, a section of which is shown in Fig. 2. Fig. 5 is an inside view of the nut, and Fig. 6 is a side elevation of a portion of a fish-plate.

The rail $a$ is of the ordinary construction, and is provided with the fish-plates $a'$ $a^2$, the plate $a^2$ being provided with a recess or depression, $a^3$, adapted to receive the part $a^4$ of the nut $a^5$, so as to prevent it from turning. The part $a^4$ of said nut is shown in the form of an oval; but any other convenient form to prevent the nut from turning will answer. It is provided with a screw-thread adapted to receive the bolt $c$, as shown. (See Figs. 1 and 2.) The bolt $c$ is provided with an enlargement, $c'$, a little larger than the hole through which it passes. $c^2$ is the head of the bolt. It is made square, or of any other suitable shape adapting it to receive a wrench for turning it. In Fig. 2 I have shown a second enlargement, $c^3$, on the bolt, which is only used after the bolt has been withdrawn from the fish-plate and it is necessary to use it again; as the hole in this case would be too large to use the bolt with the first enlargement, the washer $c^4$ is taken off and the second enlargement forced into the hole in the fish-plate.

In operating with this invention, the bolt is passed through the fish-plate and rail and secured into the stationary or fixed nut $a^5$ until the enlargement $c'$ or $c^3$ is forced into the hole in the fish-plate, in which position it is so tightly held that it cannot be moved except with a wrench and the use of considerable force.

I claim as my invention—

1. A track-lock bolt provided with an enlargement, $c'$, slightly larger than the hole it is made to enter, in combination with the fish-plates and rail and a stationary or fixed nut, substantially as and for the purposes described.

2. The combination of the bolt $c$, having an enlargement, $c'$, a second enlargement, $c^3$, and a washer, $c^4$, with the fish-plates and rail and a stationary or fixed nut, as and for the purposes specified.

D. FRANKLIN BLIGHTON.

Witnesses:
 J. M. CALDWELL,
 JAMES SANGSTER.